United States Patent [19]

Shiroyama et al.

[11] Patent Number: 5,289,070
[45] Date of Patent: Feb. 22, 1994

[54] COMMUTATOR BRUSH DEVICE FOR AUTOMATED ASSEMBLY

[75] Inventors: Shigeru Shiroyama; Akira Kuragaki, both of Himeji, Japan

[73] Assignee: Mitsubishi Denki Kabushik Kaisha, Tokyo, Japan

[21] Appl. No.: 961,875

[22] Filed: Oct. 16, 1992

[30] Foreign Application Priority Data

Oct. 29, 1991 [JP] Japan ................. 3-311624

[51] Int. Cl.$^5$ ............................................ H02K 13/00
[52] U.S. Cl. .................................... 310/239; 310/42; 310/249
[58] Field of Search .............. 310/239, 242, 245, 247, 310/42, 45, 248, 249; 29/597

[56] References Cited

U.S. PATENT DOCUMENTS

| | | |
|---|---|---|
| 3,823,781 | 7/1974 | Check et al. |
| 3,967,148 | 6/1976 | Walsh ................. 310/239 |
| 4,673,838 | 6/1987 | Takagi et al. .......... 310/239 |
| 4,754,184 | 6/1988 | Morikane ............. 310/239 |
| 4,891,539 | 1/1990 | Okamoto .............. 310/239 |
| 4,926,078 | 5/1990 | Isozumi ............... 310/239 |
| 5,148,072 | 9/1992 | Shiroyama ............ 310/239 |

FOREIGN PATENT DOCUMENTS 2178248 2/1987 United Kingdom ........... 310/239

OTHER PUBLICATIONS

Toro Sand Pro ® 14 Brochure dated 1989.
Parts Drawing for Smitch Rake Assembly (undated).

*Primary Examiner*—R. Skudy
*Attorney, Agent, or Firm*—Sughrue, Mion, Zinn, Macpeak and Seas

[57] ABSTRACT

The brush holder 12 of a brush device for a d.c. machine is provided with plural pairs of brush boxes 12a each having an open front portion and an open inner diameter portion, and a pair of projections 12d at outer portions; lead wires 14a, 14b for each pair of brushes 13a and 13b have such length that they can avoid interference with the projections 12d, and the brushes 13a, 13b can be fitted to the brush boxes 12 from the front side and in the axial direction of the brush holder 12; brush springs 15 are put at the top portion of the brushes 13a, 13b; and an insulating plate 16 is attached to the front of the brush holder 12, whereby assembling work for the brushes 13a, 13b can be automated.

2 Claims, 3 Drawing Sheets

COMMUTATOR BRUSH DEVICE FOR AUTOMATED ASSEMBLY

BACKGROUND OF THE INVENTION

1. Field of the Invention

The present invention relates to a brush device for a d.c. machine such as a starter motor.

2. Discussion of Background

FIG. 3 is a front view showing a conventional brush device as disclosed, for instance, in U.S. Pat. No. 4,754,184. In FIG. 3, reference numeral 1 designates a commutator for a d.c. machine, numeral 30 designates an insertion opening for receiving the commutator 1, and numeral 2 designates a brush holder of a molded product of a synthetic resinous material wherein four brush boxes 2a having a channel-like shape in cross-section are formed in one side of the brush holder 2. Each top portion in the radial direction of the brush boxes 2a is closed but the inner portion of each of the brush boxes 2a is open, and the front end side of the brush boxes 2a to which an insulating plate 6 (which is described later) is contacted has an open portion 2b. A pair of projections 2d are formed in the brush holder 2 so as to project outwardly. The brush boxes 2a receive brushes 3a of a negative pole and brushes 3b of a positive pole. A brush spring 5 is put in each of the brush boxes 2a so as to push each of the brushes 3a, 3b toward the insertion opening 30.

Numeral 6 designates an insulating plate which is engaged radially with an engaging portion 2c of the brush holder 2 and which closes the opening portion 2b of each of the brush boxes 2a to thereby form brush receiving portions 31. The insulating plate 6 insulates the brushes 3a, 3b from the rear bracket of the d.c. machine.

Numerals 7a, 7b designate a pair of fitting pieces which are fitted to a the pair of projections 2d of the brush holder 2 and push or clamp, for engagement and position-determination, the insulating plate 6 to the brush holder 2. The fitting pieces 7a, 7b are made of metal and are provided with threaded holes so that they are attached to the rear bracket by means of bolts. FIG. 4 shows an embodiment of the fitting piece 7b.

In FIG. 3, reference numeral 7c designates a pair of projections which are formed integrally with the fitting piece 7a and which are connected by welding with lead wires 4a extended from the pair of brushes 3a of a negative pole, whereby the brushes 3a are electrically connected to the rear bracket. Lead wires 4b are extended from the pair of brushes 3b of a positive pole and are electrically connected to a single lead wire 9.

Explanation of the above-mentioned conventional device will be made as to how to attach the brushes 3a, 3b to the brush holder 2.

First, each of the lead wires 4a for the pair of brushes 3a is connected to the fitting piece 7a by means of each of the projections 7c formed integrally with the fitting piece 7a, whereby a brush connector is formed. Before attaching the insulating plate 6, the brush connector is located in the vicinity of the projection 2d which is extended to the left side of the brush holder 2, and then, one of the brushes, e.g. the brush 3a located at the upper part is fitted to the upper left brush box 2a by hand. Pushing the upper brush 3a into the brush box 2a, which is fitted to the brush box 2a so that the brush 3a does not come off the brush box 2a, the fitting piece 7a is moved beyond the projection 2d from the front side to the rear side of the projection 2d so as not to interfere with the projection 2d. In this case, the lower brush 3a which is not yet fitted to the other brush box 2a is in a state of hanging from the fitting piece 7a at the lower side of the projection 2d, which has been moved beyond the projection 2d together with the upper brush 3a. Then, the lower brush 3a is brought to the front side and is fitted to the lower left brush box 2a. Thereafter, each brush spring is put under compression to the top portion of each of the brushes 3a.

Next, the pair of lead wires 4b connected with the brushes 3b and the lead wire 9 are connected to the right fitting piece 7b. In the same manner as the case of the fitting piece 7a, the fitting piece 7b is located in the vicinity of the right projection 2d, and the pair of brushes 3b are successively fitted to the upper and lower right brush boxes 2a.

The insulating plate 6 is brought to the front side of the brush holder 2, and the right and left fitting pieces 7a, 7b are moved radially toward the center of the brush holder 2 to be fitted to the projections 2d. At the same time, the edges of the insulating plate 6 are clamped from the right and left sides by means of the fitting pieces 7a, 7b. In the state that the pair of brushes 3a are fitted to the brush boxes 2a, the brushes 3a can be moved in the radial direction so that there is looseness in the lead wires 4a. Accordingly, it is possible to attach the fitting piece 7a from the left side of the projection 2d.

When the fitting piece 7a is moved from the front side to the rear side of the brush holder 2 after the pair of brushes 3a have been fitted to the brush boxes 2a, there is interference between the fitting piece 7a and the projections 2d, and accordingly, the movement of the fitting piece 7a is impossible. Even though the brushes 3a are moved outwardly in the radial direction, it is impossible to avoid both projections 2d. Since the projections 2d are provided at a position deflected to the front side of the brush holder 2 (in FIG. 1B, the projections 12d are formed at the upper and lower right portions of the brush holder 12), the brushes 3a fitted to the brush boxes 2a are not on the same plane with the fitting piece 7a under a condition that fitting piece 7a is in contact with the projections 2d from the front side, and accordingly, the lead wires 4a are inclined, whereby the length of the lead wires 4a becomes short. On the other hand, in accordance with the above-mentioned method, the brushes 3a fitted to the brush boxes 2a are flush with the fitting piece 7a, and the brushes 3a can be freely movable in the radial direction in the brush boxes 2a, whereby there can be looseness in the lead wires 4a.

However, in the above-mentioned conventional brush device, when the brushes 3a, 3b are put in the brush boxes 2a of the brush holder 2, it is necessary to put them in the brush boxes 2a in the axial direction after the brushes are moved inwardly in the radial direction. Accordingly, automation of assembling the brushes is difficult, and manual operation of such assembling work decreases productivity.

SUMMARY OF THE INVENTION

It is an object of the present invention to provide a brush device which allows an automatic assembling operation of the brushes to the brush boxes of a brush holder to thereby increase productivity.

In accordance with the present invention, there is provided a brush device which comprises a brush holder 12, a brush connector 41 and an insulating plate 16. The brush holder 12 is provided with an insertion opening 30 for receiving a cylindrical commutator, brush boxes 12a which are in a channel-like shape and are arranged in the radial direction with respect to the center of the insertion opening 30 in one side surface of the brush holder 12, and projections 12d which are located between the brush boxes 12a and project outwardly from the insertion opening 30 in the radial direction. The brush connector 41 is provided with a fitting piece or assembly clamp 17a, a pair of lead wires 14a and a pair of brushes 13a wherein each of the brushes 13a is connected to the fitting piece or assembly clamp 17a through one of the lead wires 14a, and the length of the pair of lead wires 14a is such that the fitting piece or assembly clamp 17a can be moved beyond the projections 12d, without interference with them from one side of the brush holder 12 to the other side in a state that the pair of brushes 13a are inserted in the brush boxes 12a. The insulating plate 16 closes the brush boxes 12a to thereby form brush receiving portions to receive the brushes 13a, and the insulating plate 16 is fixed to the brush holder 12 by means of the fitting piece 17a fitted to the projections 12d.

Further, in accordance with the present invention, there is provided a brush device which comprises a brush holder 12, a brush connector 42 and an insulating plate 16. The brush holder 12 is provided with an insertion opening 30 for receiving a cylindrical commutator, brush boxes 12a which are channel-shaped and are arranged in the radial direction with respect to the center of the insertion opening 30 in one side surface of the brush holder 12, and projections 12d which are located between the pair of brush boxes and project outwardly from the insertion opening 30 in the radial direction. The brush connector 42 is provided with a connecting wire 43 and a pair of brushes 13b wherein the connecting wire 43 has a branch 43a at an intermediate site from which a pair of lead wires 14b are branched to be connected with each brush 13b, and the length of the pair of lead wires 14b is such that the branch site 43a can be moved beyond the projections 12d, without interference with them, from one side of the brush holder 12 to the other side in a state that the pair of brushes 13b are inserted in the brush boxes 12b. The insulating plate 16 closes the brush boxes 12b to thereby form brush receiving portions to receive the brushes 13b, and the insulating plate 16 is fixed to the brush holder 12 by means of the fitting piece 17b fitted to the projections 12d.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1A:
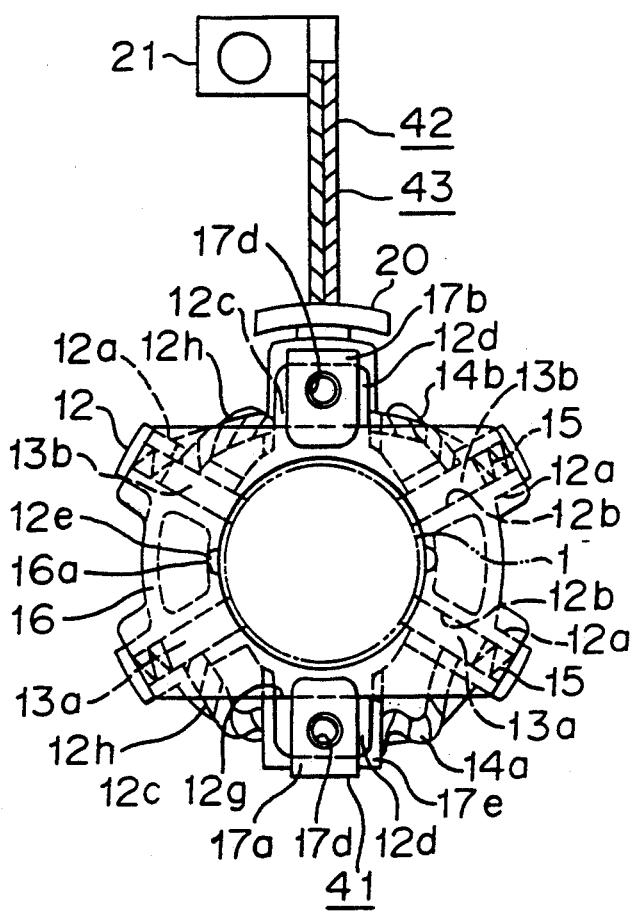
FIG. 1A is a front view of an embodiment of the brush device according to the present invention.
Figure 1B:
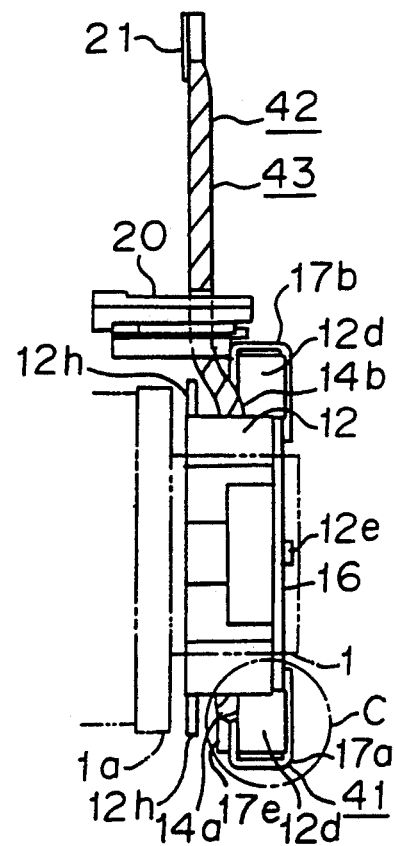
FIG. 1B is a side view of the brush device shown in FIG. 1A.

Referring to the drawings wherein the same reference numerals designate the same or corresponding parts throughout several views, and more particularly to FIGS. 1A and 1B, there are shown a front view and a side view of an embodiment of the brush device according to the present invention.

Reference numeral 12 designates a brush holder formed by molding a resinous material wherein four brush boxes 12a are formed to have a channel-like shape in cross section. The top portion in the radial direction of each of the brush boxes 12a is closed, the inner diameter portion of each of the brush boxes is open and the front side to which an insulating plate (which will be described hereinafter) is fitted and which directs in the axial direction of the brush holder have open, brush receiving portions or channels 12b.

The brush holder 12 is provided with a pair of projections 12d at its outer circumferential portion in the radial directions, and a pair of engaging projections 12e which are formed at the inner circumferential portion so as to project forwardly. A pair of negative pole brushes 13a are respectively connected with lead wires 14a, and one end of each of the lead wires is connected to projections 17e by welding which are formed at both sides of a fitting piece 17a.

A connecting wire 43 has a branch site 43a from which a pair of lead wires 14b are branched. The pair of lead wires 14b are respectively connected to a pair of positive pole brushes 13b. An insulating bush 20 made of rubber is fitted to an intermediate portion of the lead wire 43, the free end of which is connected with a terminal 21 by means of soldering or crimping. Unification of the lead wires 14b at the branch site 43a is effected by welding element wires. The insulating bush 20 is to be fitted to an opening of the rear bracket at its neck portion.

The insulating plate 16 is engaged with engaging portions 12c and the engaging projections 12e of the brush holder 12 in the radial and circumferential directions respectively so that the insulating plate 16 is brought into contact with the open portions of the brush boxes 12a from their front side so as to close the openings. The insulating plate 16 functions to isolate the brushes 13a, 13b from the rear bracket of the d.c. machine.

Numerals 17a, 17b designate respectively a pair of fitting pieces or assembly clamps which are fitted to the pair of projections 12d of the brush holder 12 and which push into place to determine the position of the insulating plate 16 on the brush holder 12. The fitting pieces are made of metal.

Numeral 41 designates a negative pole brush connector wherein the brushes 13a are connected to the fitting piece 17a via the lead wires 14a and the projections 17e respectively. Each of the lead wires 14a is so dimensioned that the fitting piece 17a can be passed outside the projection 12d without any interference with it from one side to the other (e.g. from the right side to the left side of the brush holder 12 in FIG. 1B) in a state that the pair of brushes 13a is inserted in the brush boxes 12a (see FIG. 2).

Figure 2:
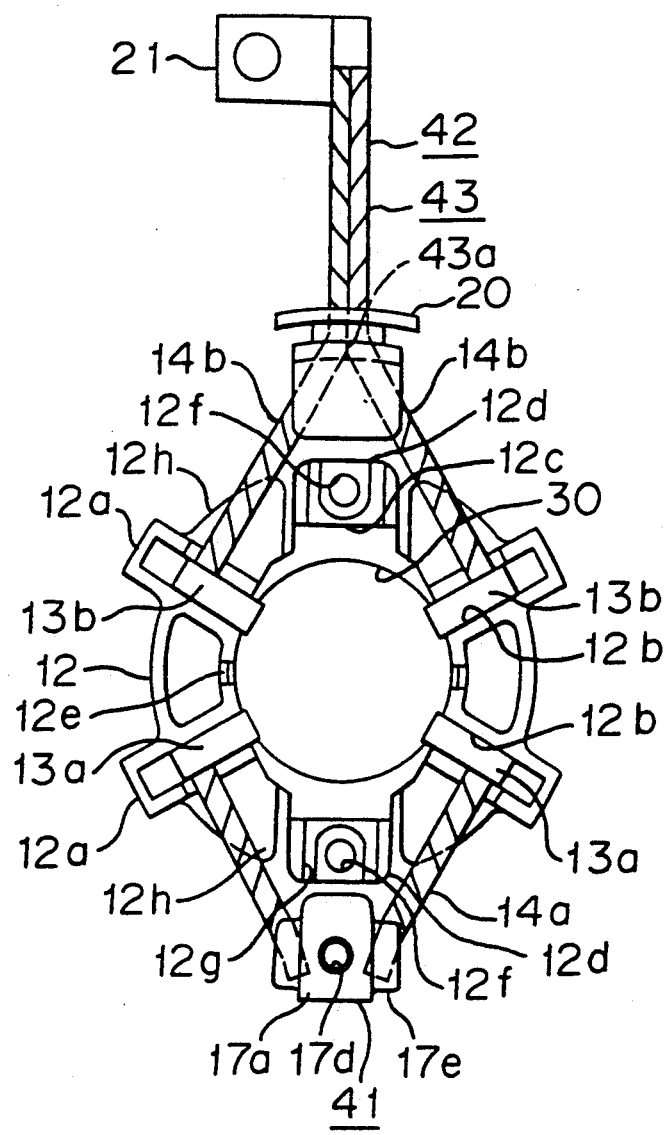
FIG. 2 is a front view showing how brushes are assembled in a brush holder shown in FIG. 1A.
Figure 3:
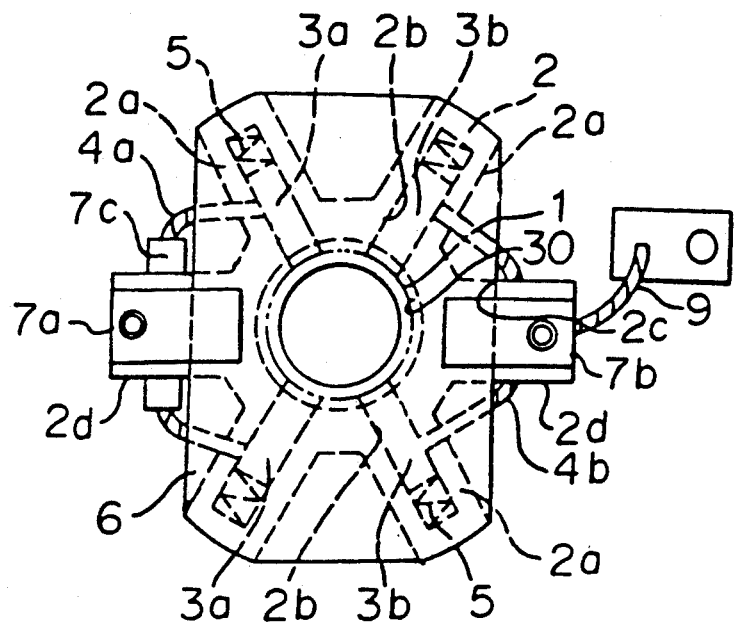
FIG. 3 is a front view showing a conventional brush device.
Figure 4:
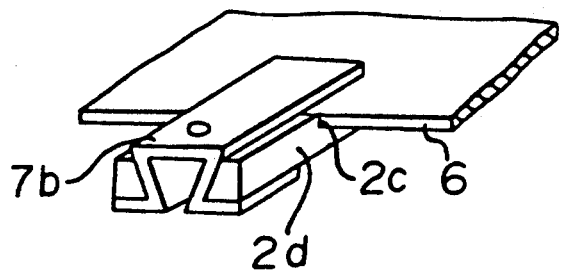
FIG. 4 is a perspective view of a fitting piece shown in FIG. 3.

Numeral 42 designates a positive pole brush connector wherein the terminal 21 is connected to the free end of the connecting wire 43 which has the branch site 43a at an intermediate position from which the pair of lead wires 14b are branched. The pair of lead wires 14b are respectively connected to the pair of brushes 13b. Element wires which constitute the connecting wire 43 are unified by welding at the branch site 43a. The length of the connecting wires 14b is so determined that the branch site 43a can be passed outside the projection 12d without any interference from one side to the other (e.g. from the right hand to the left hand of the brush holder 12 in FIG. 1B) in a state that the pair of brushes 13b is put in the brush receiving channels 12b (FIG. 2).

Figure 1C:
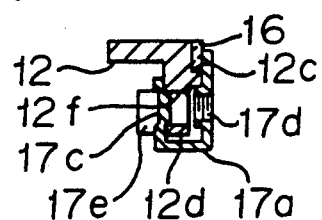
FIG. 1C is a cross-sectional view of a C-part of the brush device shown in FIG. 1B.

The structure of the fitting piece 17a is shown by a cross-sectional view in FIG. 1C. The fitting piece 17a is bent into a channel-like shape. The fitting piece 17a is fitted to the projection 12d wherein the front side of it is guided by a guide groove 12g and a projection 17c formed at the rear side portion is engaged with a through hole 12f of the projection 12d. The fitting piece 17a connects the insulating plate 16 to the brush holder 12. The fitting piece 17a is attached to the rear bracket by a fastening bolts in threaded hole 17d. The fitting piece or assembly clamp 17b has the same structure as the fitting piece 17a provided that a projection 17e is not formed.

The brush holder 12 is provided with flanges 12h which are extended from the rear portion of each of the brush boxes 12a in the direction of the projections 12d, whereby the flanges 12h prevent the lead wires 14a, 14b from projecting backwardly. The flanges 12h prevent the lead wires 14a, 14b from contacting the riser 1a of the commutator 1.

The assembling operation of the brushes 13a, 13b to the brush holder 12 in the above-mentioned brush device of the present invention will be described with reference to FIG. 2.

The pair of negative pole brushes 13a are put in the brush boxes 12a from the front side and in the axial direction of the brush holder so that the lead wires 14a avoid contact with the upper projections 12d. The pair of positive pole brushes 13b are put in the brush boxes 12a from the front side and in the axial direction of the brush holder 12 so that the lead wires 14b avoid contact with the lower projections 12d. Brush springs 15 are put into spaces between the top portion of the brushes 13a, 13b and the top portion of the brush boxes 12a respectively (FIG. 1). Then, the insulating plate 16 is attached to the front face of the brush holder 12 by fitting engaging recesses 16a formed at the inner diameter portions to the engaging projections 12e of the brush holder 12 and by fitting the insulating plate 16 to the engaging portions 12c of the brush holder 12 which determine the position of the insulating plate. Then, the fitting pieces 17a, 17b are fitted to the projections 12d so that the insulating plate 16 is clamped to the brush holder 12. Under such condition, the brush device is attached to the rear bracket through the fitting pieces 17a, 17b by means of bolts.

The brushes 13a, 13b are respectively connected with longer lead wires 14a, 14b. Accordingly, the brushes can be inserted into the brush boxes 12a from the front portion and in the axial direction of the brush holder while the lead wires 14a, 14b are moved beyond the projections 12d. Therefore, an automatic assembling operation by an automatic assembling machine is possible, and labor-saving, can be effected.

Obviously, numerous modifications and variations of the present invention are possible in light of the above teachings. It is therefore to be understood that within the scope of the appended claims, the invention may be practiced otherwise than as specifically described herein.

What is claimed is:

1. A brush device, comprising: a brush holder (12), a brush connector (41), and an insulating plate (16), wherein:
    said brush holder is provided with an insertion opening (30) for receiving a cylindrical commutator, brush boxes (12a) which are channel-shaped and are arranged in a radial direction with respect to a center of the insertion opening in one side surface of the brush holder, and projections (12d) which are located between said brush boxes and project outwardly from the insertion opening in the radial direction;
    said brush connector is provided with an assembly clamp (17a), a pair of lead wires (14a), and a pair of brushes (13a), wherein the brushes are individually connected to the assembly clamp through the lead wires, and a length of the pair of lead wires is such that the assembly clamp can be moved beyond the projections without interference therewith, from one side of the brush holder to another, opposite side with the pair of brushes individually disposed in the brush boxes to thereby enable and facilitate machine assembly to the brush holder of the brushes to the brush holder; and
    said insulating plate closes the brush boxes to thereby form brush receiving channels (12b) to receive the brushes, and the insulating plate is fixed to the brush holder by the piece 17a assembly clamp engaging the projections.

2. A brush device, comprising: a brush holder (12), a brush connector (42), and an insulating plate (16), wherein:
    said brush holder is provided with an insertion opening (30) for receiving a cylindrical commutator, brush boxes (12a) which are channel-shaped and are arranged in a radial direction with respect to a center of the insertion opening in one side surface of the brush holder, and projections (12d) which are located between said brush boxes 12b project outwardly from the insertion opening in the radial direction;
    said brush connector is provided with a connecting wire (43) and a pair of brushes (13b), wherein the connecting wire has a branch site (43a) at an intermediate position from which a pair of lead wires (14b) are branched to be individually connected with the brushes, and a length of the pair of lead wires is such that the branch site can be moved beyond the projections without interference therewith, from one side of the brush holder to another, opposite side with the pair of brushes individually disposed in the brush boxes to thereby enable and facilitate automated assembly of the brushes to the brush holder; and
    said insulating plate closes the brush boxes to thereby form brush receiving channel (12b) to receive the brushes, and the insulating plate is fixed to the brush holder 12 by an assembly clamp (17b) engaging the projections.

* * * * *